(12) United States Patent
Berry

(10) Patent No.: US 8,066,513 B2
(45) Date of Patent: Nov. 29, 2011

(54) SYSTEM FOR CORRELATING PSYCHOLOGICAL PROFILE TO CUSTOMIZED ENVIRONMENT

(76) Inventor: John R. Berry, Holland, MI (US)

(*) Notice: Subject to any disclaimer, the term of this patent is extended or adjusted under 35 U.S.C. 154(b) by 902 days.

(21) Appl. No.: 11/597,035

(22) PCT Filed: May 19, 2005

(86) PCT No.: PCT/US2005/018062
§ 371 (c)(1),
(2), (4) Date: Mar. 7, 2008

(87) PCT Pub. No.: WO2005/114451
PCT Pub. Date: Dec. 1, 2005

(65) Prior Publication Data
US 2008/0263092 A1  Oct. 23, 2008

Related U.S. Application Data

(60) Provisional application No. 60/573,011, filed on May 19, 2004.

(51) Int. Cl.
*G09B 19/00* (2006.01)
(52) U.S. Cl. ........................ 434/236; 705/26.1; 705/26.7
(58) Field of Classification Search .................. 434/236, 434/350; 463/30–31, 34, 36; 715/708; 707/E17.044; 705/2, 9–10, 319, 26.1, 26.7; 473/152
See application file for complete search history.

(56) References Cited

U.S. PATENT DOCUMENTS

2002/0045154 A1 * 4/2002 Wood et al. .................. 434/350
* cited by examiner

*Primary Examiner* — Xuan Thai
*Assistant Examiner* — Timothy A Musselman
(74) *Attorney, Agent, or Firm* — Rohm & Monsanto, PLC

(57) ABSTRACT

A method of producing a customized environment for a client includes the steps of identifying the psychological profile of the human client as at least one of a plurality of predetermined psychological profile types. A plurality of selectable personal environment types are determined, and a psychological profile type of the human client is correlated to one of the selectable plurality of personal environment types. An arrangement for selecting the customized environment for the human client includes an input arrangement for inputting client information into a computer, a client information memory areas for storing the client information, an environment memory area for storing information relating to a plurality of environment types, each environment type having a respectively associated memory address, and a processor coupled to the client information memory area and the environment memory area, the processor converting the client information into a memory address, such as a database address.

34 Claims, 4 Drawing Sheets

SYSTEM FOR CORRELATING PSYCHOLOGICAL PROFILE TO CUSTOMIZED ENVIRONMENT

RELATIONSHIP TO OTHER APPLICATION

This application is a US national stage filing under 35 U.S.C. §371 of International Application No. PCT/US2005/018062 filed on May 19, 2005 and claims the benefit under 35 U.S.C. §119(e) of Provisional U.S. Patent Application Ser. No. 60/573,011, filed on May 19, 2004, the disclosure of which is incorporated herein by reference.

BACKGROUND OF THE INVENTION

1. Field of the Invention

This invention relates generally to systems for customizing personal environments, and more particularly, to a system that will correlate at least one of a plurality of predetermined personal environments with the psychological profile of the intended occupant of the environment.

2. Description of the Related Art

It is becoming increasingly apparent, particularly in the workplace, that morale and productivity are increased when the worker is situated in an environment that is consistent with the nature of the worker's function and his or her working style. Presently, improvements in worker efficiency, productivity, and morale are sought to be achieved by structuring the work environment to reflect an efficient work throughput, and additionally to include decorative features that include wall and fabric patterns and colors, perhaps selected by the worker who would occupy the environment under consideration.

A similar approach has been used in residential and other environments in an effort to improve the occupant's sense of well-being. More specifically, residential environments generally are tailored to the desires of the residents by the selection of furniture, its style and arrangement, and decorative features of the space in accordance, generally in accordance with the subjective desires of the resident(s). Nevertheless, irrespective of whether the environment in question is a workplace or a residential space in its character, functional and aesthetic considerations are not in and of themselves adequate to fulfill the needs of the occupant that would be mandated by the personality traits or characteristics of the occupant.

It is, therefore, an object of this invention to provide a system for correlating the characteristics of an environment to the personality characteristics of the occupant.

It is another object of this invention to provide a system for correlating a plurality of personality characteristics to predetermined environment types.

It is also an object of this invention to provide a system for correlating a plurality of personality characteristics to predetermined office environments.

It is a further object of this invention to provide a system for correlating predetermined office environments to commercially available items of office furniture.

It is additionally an object of this invention to provide a system for correlating a psychological profile to at least one of a plurality of predetermined environment types.

It is yet a further object of this invention to provide a system for correlating a psychological profile obtained by means of a Web-based psychological testing system to at least one of a plurality of predetermined environment types.

It is also another object of this invention to provide a system for correlating a predetermined office environment to commercially available items of office furniture that correspond to data items stored in a remote computer system.

SUMMARY OF THE INVENTION

The foregoing and other objects are achieved by this invention which provides a method of determining a customized environment for a human client. In accordance with this aspect of the invention, the method includes the steps of:

identifying the psychological profile of the human client as at least one of a plurality of predetermined psychological profile types;

determining a plurality of selectable personal environment types; and correlating a psychological profile type of the human client to a one of the selectable plurality of personal environment types.

In one embodiment of this method aspect of the invention, the step of identifying the psychological profile of the human client includes the step of subjecting the human client to psychological examination. This may include the step of subjecting the human client to psychological examination on an internet-based psychological testing facility.

In a further embodiment, there is provided the further step of recording the plurality of selectable personal environment types whereby each of the plurality of selectable personal environment types is accessible in response to the step of identifying the psychological profile of the human client. One of the plurality of selectable personal environment types is accessed in response to one of the predetermined psychological profile types identified in the step of identifying the psychological profile of the human client. The psychological profile of the human client is, in some embodiments, an intuition-dominant thinking profile type and a correspondingly selected personal environment is an open environment with ample storage space and distinct work surfaces for multiple tasks.

In a still further embodiment, the psychological profile type identified in the step of identifying the psychological profile of the human client is a predominately sensing and sympathizing profile type and a correspondingly selected personal environment is an environment that enables interactions with other persons and work surfaces that facilitate transfer of information.

In a yet another embodiment, the psychological profile type identified in the step of identifying the psychological profile of the human client is a sensing and cogitating profile type and a correspondingly selected personal environment is an environment configured for privacy and convenient access to work tools. The psychological profile type identified in the step of identifying the psychological profile of the human client may be a predominately intuitive profile type and a correspondingly selected personal environment is an environment configured for privacy with access to storage for reference materials and a conference area.

The psychological profile type identified in the step of identifying the psychological profile of the human client is, in certain embodiment, based on a ranking of a plurality of predetermined psychological characteristics. These predetermined psychological characteristics relate to a plurality of predetermined action modes that characterize potential conduct of the human client. The predetermined action modes that characterize potential conduct of the human client are ranked relative to each other. The step of correlating a psychological profile type of the human client to a one of the selectable plurality of personal environment types is responsive to a dominant one of the predetermined action modes that characterize potential conduct of the human client.

In accordance with a further method aspect of the invention, there is provided a method of determining a customized environment for a human client. The method includes the steps of:

identifying the psychological profile of the human client as at least one of a plurality of predetermined psychological profile types in response to a ranking of a plurality of predetermined psychological characteristics;

determining a plurality of selectable personal environment types; and correlating a psychological profile type of the human client to a one of the selectable plurality of personal environment types.

In one embodiment of this further aspect of the invention, the predetermined psychological characteristics relate to a plurality of predetermined action modes that characterize potential conduct of the human client.

The predetermined psychological characteristics relate to a plurality of predetermined instinctive action modes that characterize the human client. In other embodiments, the predetermined psychological characteristics relate to a plurality of psychological patterns that characterize the human client.

In accordance with a still further method aspect of the invention, there is provided a method of determining a customized environment for a human client, the method includes the steps of:

subjecting the human client to examination to produce examination data that is responsive to the responses of the human client to the examination;

producing psychological profile data that is responsive to the examination data and characterizes the psychological profile of the human client to at least one of a plurality of predetermined psychological profile types;

determining a plurality of selectable personal environment types; and correlating a psychological profile type of the human client in the step of producing psychological profile data to a one of the selectable plurality of personal environment types.

In one embodiment of this still further method aspect, the step of subjecting the human client to examination includes the step of causing the human client to provide answers to questions. In the step of causing the human client to provide answers to questions, the questions are configured to facilitate identification of psychological profile characteristics of the human client. The answers to questions as the examination data are entered into a computer system, and the examination data is ranked in accordance with a data ranking system that is responsive to the plurality of predetermined psychological profile types, the ranking being performed in the computer system.

In a further embodiment, the step of correlating a psychological profile type of the human client to a one of the selectable plurality of personal environment types includes the further step of second correlating the plurality of personal environment types to a corresponding plurality of predetermined residential environment characteristics. Also, the step of correlating a psychological profile type of the human client to a one of the selectable plurality of personal environment types includes the further step of second correlating the plurality of personal environment types to a corresponding plurality of predetermined office characteristics. There are further provided the steps of third correlating each of the plurality of predetermined office characteristics to a corresponding arrangement of office furniture, and the step of fourth correlating each of the plurality of corresponding arrangement of office furniture to associated cataloged items of office furniture.

As previously noted, one of the plurality of predetermined psychological profile types of the human client is an intuition-dominant cogitating profile type that corresponds to a visionary client. Alternatively, the personal environment type corresponds to an open environment with ample storage space and distinct work surfaces for multiple tasks; or the human client is a sensing and sympathizing profile type who corresponds to a cooperator client; or the personal environment type corresponds to an environment that enables interactions with other persons and work surfaces that facilitate transfer of information. The human client may be a sensing and cogitating profile type who corresponds to a stabilizer client, and the personal environment type corresponds to an environment configured for privacy and convenient access to work tools. Alternatively, the human client is an intuitive and sympathizing profile type who corresponds to a catalyst client, and the personal environment type corresponds to an environment configured for privacy with access to storage for reference materials and a conference area.

In accordance with an arrangement aspect of the invention, there is provided an arrangement for selecting a customized environment for a human client, the apparatus including an input arrangement for inputting client information into a computer. A client information memory area stores the client's information, and an environment memory area stores information relating to a plurality of environment types, each environment type having a respectively associated memory address. A processor is coupled to the client information memory area and to the environment memory area, the processor serving to convert the client's information into a memory address.

In one embodiment, the client's information is client psychological information, and there is further provided an examination memory area for storing psychological testing data. The client psychological information is, in one embodiment, responsive to the psychological testing data. A modem transmits to a remote computer the client psychological information and receiving a responsive client psychological profile.

BRIEF DESCRIPTION OF THE DRAWING

Comprehension of the invention is facilitated by reading the following detailed description, in conjunction with the annexed drawing, in which.

DETAILED DESCRIPTION

Figure 1:
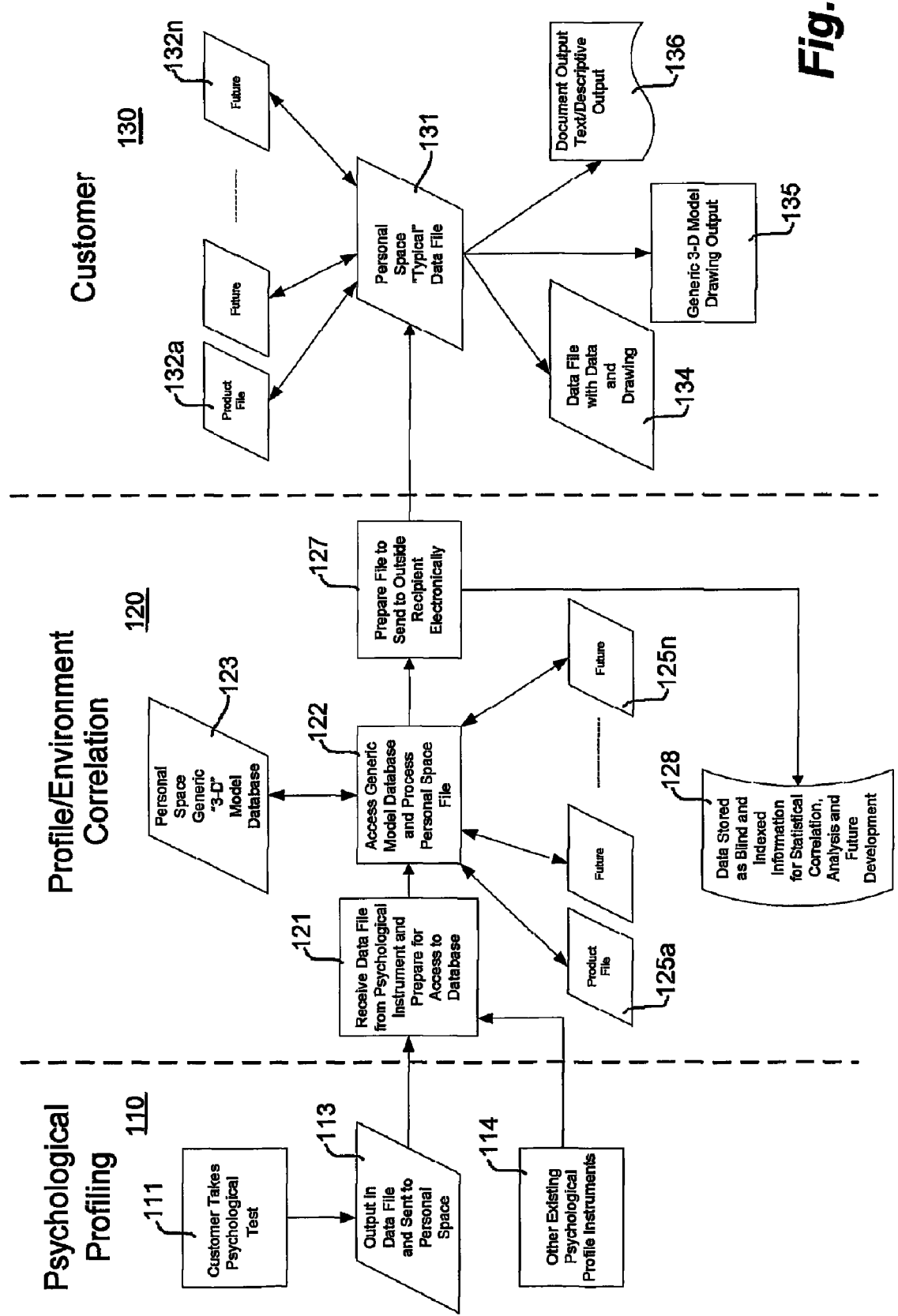
FIG. 1 is a block and line representation of a specific illustrative embodiment of the invention wherein a typical personal space data file is provided to a customer.

FIG. 1 is a block and line representation of a specific illustrative embodiment of the invention wherein a typical personal space data file is provided to a customer. As shown in this figure, there is provided a psychological profiling portion 110, a profile/environment correlation portion 120, and a customer section 130. The customer (not shown) is subjected to psychological testing at function block 111. The information corresponding to the results of the psychological testing is converted to a data file at function block 113, the file (not specifically designated) then is transmitted to profile/environment correlation portion 120, specifically at function block 121. Function block 121 may, in certain embodiments, receive additional information from other psychological profiling instruments 114, which may include, for example, other psychological tests or physical instruments (not shown), such as galvanic response equipment, blood pressure monitoring systems, or any other system that will produce data that is responsive, or otherwise bears relevance, to the psychological condition of the client.

The data that is received at function block 121 is conducted to a computerized data access arrangement (not specifically designated) that, at function block 122, accesses, in this specific illustrative embodiment of the invention, generic three-dimensional model personal space environments from a database 123. In addition, the computerized access arrangement accesses product files from product file databases 125a through 125n. The product databases contain data that corresponds to available products, such as furniture and other items that can be used to populate the customized personal environment (not shown), illustratively from respective predetermined manufacturers. As previously noted, in a specific illustrative embodiment of the invention, the generic three-dimensional personal space model is selected in response to the psychological information obtained from function block 121, and the corresponding products from product file databases 125a through 125n are selected in response to the generic three-dimensional personal space model.

A file that contains data corresponding to the generic three-dimensional personal space model and the corresponding products from product file databases 125a through 125n is prepared at function block 127 for transmission to an outside recipient, such as a customer (not shown). However, in this specific illustrative embodiment of the invention, the information in the file to be transmitted is stored locally in a storage region 128 for statistical correlation, analysis, and future development.

In embodiments of the invention where a customer, who may be, for example, an architect, designer, supplier of furnishings, etc., the file in function block 127 is transmitted to the customer at function block 131. In some embodiments, the customer may perform addition correlations to products, which optionally may include other product lines marketed by the customer, using product data stored in databases 132a to 132n. The resulting data file is then produced as an output in the form of data and drawing at function block 134, a generic three-dimensional drawing output at function block 135, and/or a text document output 136.

Figure 2:
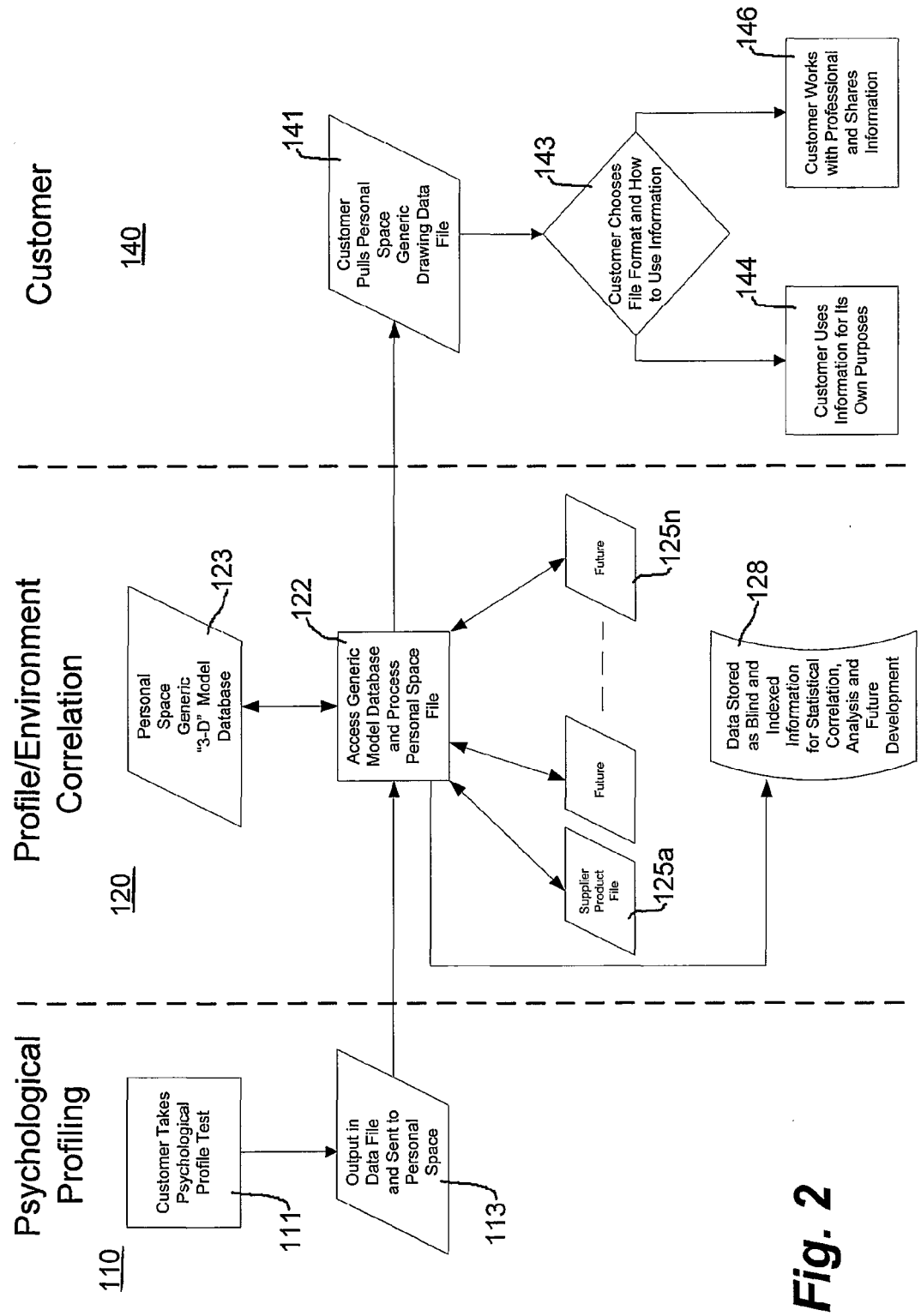
FIG. 2 is a block and line representation of a further specific illustrative embodiment of the invention wherein a generic drawing space data file is provided to a customer.

FIG. 2 is a block and line representation of a further specific illustrative embodiment of the invention wherein a generic drawing space data file is provided to a customer. Elements that have previously been discussed are similarly designated. As shown in this figure, and as described above, there are provided a psychological profiling portion 110 and a profile/environment correlation portion 120. In this specific illustrative embodiment of the invention, a customer section 140 receives at a function block 141 the file (from function block 122) that contains the data that corresponds to the generic three-dimensional personal space model from database 123 and the corresponding products from product file databases 125a through 125n. The file is transmitted to the customer (not shown) at function block 141.

In this specific illustrative embodiment of the invention, the customer determines at function block 143 the desired file format, which may be any of the data and drawing, a generic three-dimensional drawing output, or a text document output, as previously noted. The customer then uses the information for its own purposes at function block 144, or provides the data to an architect, designer, or other professional at function block 146.

Figure 3:
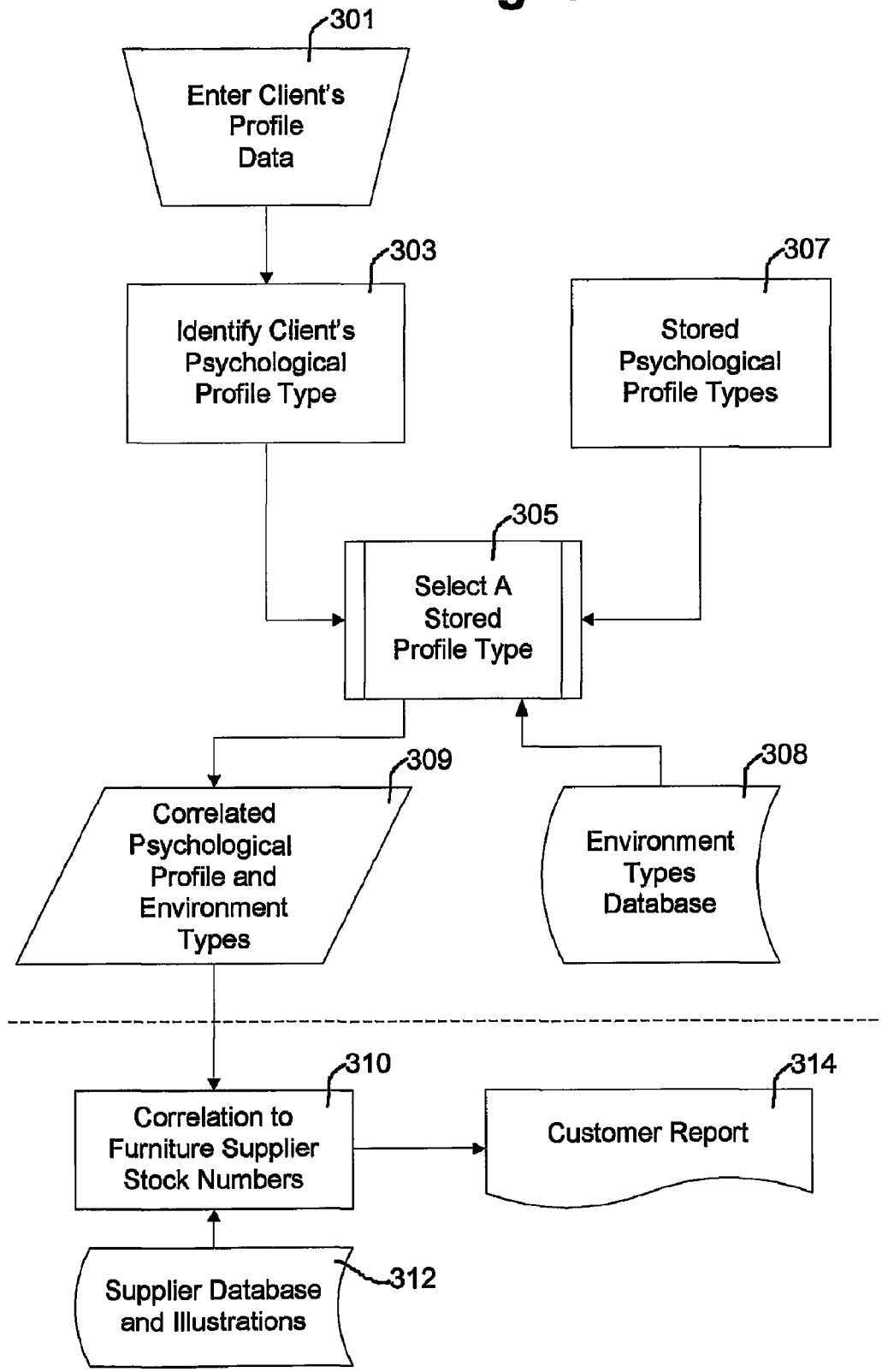
FIG. 3 is a block and line system representation that is useful in describing a methodology employed in the practice invention.

FIG. 3 is a block and line system representation that is useful in describing a methodology employed in the practice of the invention. Client profile data is entered into a computing system at function block 301, and the psychological profile type is determined at function block 303. At function block 305, one of a plurality of psychological profile types that are stored in a psychological profile database 307 is selected. Also, a corresponding environment type is selected from the database 308 of stored environment types.

The correlated selected psychological profile type and the selected environment type are transmitted from a function block 309 to a function block 310 where the data is correlated to the stock numbers of a furniture supplier that are stored, with illustrations, in a database 312. The correlated results are then issued as a customer report at function block 314.

Figure 4:
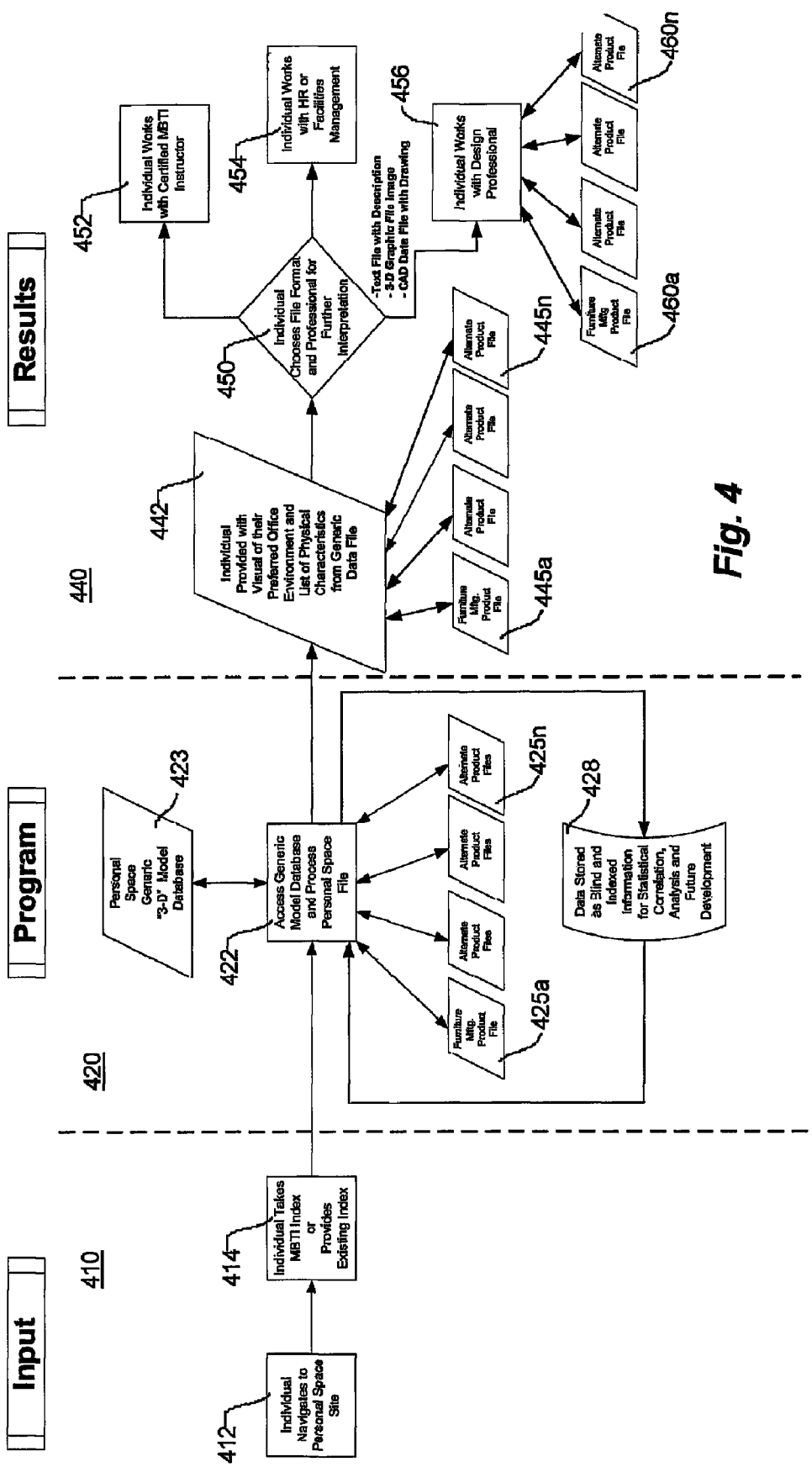
FIG. 4 is a block and line representation of a further specific illustrative embodiment of the invention wherein office furniture data is provided to a customer in response to psychological profile data and the ultimate selection of the office space elements is performed optionally in combination with an instructor and/or other professional.

FIG. 4 is a block and line representation of a process flow of a specific illustrative embodiment of the invention wherein office furniture data is provided to an individual (not shown) in response to psychological profile data and the ultimate selection of the office space elements is performed in combination with an instructor and/or other professional. More specifically, and as depicted herein, the process flow of the present embodiment is divided into an input section 410, a program section 420, and a results section 440. At function block 412 of input section 410, an individual commences the process by navigating on a computer (not shown) to the Personal Space Site, which may be a site in the internet or other network. Once at the site, the individual takes psychological examination, such as the Meyers-Briggs Test Index (MBTI) examination for determining the psychological profile index of the individual. Alternatively, the individual provides known index data.

The index data is propagated to program section 420, specifically function block 422, where a generic model database 423 is accessed and the personal space file is processed. In this specific illustrative embodiment of the invention, the generic model database is a 3-D model database, where three-dimensional data is stored. The resulting data is then correlated during the processing of the personal space file to the product lines of various manufacturers, stored as product files, at function blocks 425a to 425n. In addition, the information in the file to be transmitted is stored locally in a storage region 428 for statistical correlation, analysis, and future development, in a manner similar to that described hereinabove in connection with storage region 128 of FIGS. 1 and 2.

Referring once again to FIG. 4, the data that results from the processing of the personal space file at function block 422 is propagated to the results section 440 where it is received at a function block 442. Here, the individual is provided with visual data corresponding to the preferred office environment. In addition, there is provided at this function block a list of physical characteristics derived from the generic data file (from database 423 via function block 422). The visual information is obtained from storage regions 445a to 445n, each of which contains data corresponding the products of a specific manufacturer.

Having viewed the manufacturers' preselected product lines at function block 442, the individual then make a determination at function block 450 as to the type of file format he or she desires to user, i.e., text file with description, 3-D graphic file image, CAD data file with drawing, etc. In addition, the individual makes a determination as to whether he or she desires toe assistance of a professional for interpreting why the particular manufacturers and the corresponding product lines were selected. The selected professional may, by way of example, be a certified Meyers-Briggs instructor at function block 452, an individual who works in a human resources department or otherwise assists management, at function block 454, or a design professional at function block 456. The design professional will, in this specific illustrative embodiment of the invention, reference the manufacturers' product lines, stored as files in regions 460a to 460n. This will facilitate final selection of the office space environment, to the satisfaction of the individual and in accordance with the principles of the invention.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. A method of determining a customized environment for a human client, the method comprising the steps of:
    subjecting the human client to psychological examination using a computerized psychological testing facility to identify the psychological profile of the human client as at least one of a plurality of predetermined psychological profile types, the identified at least one of a plurality of predetermined psychological profile types being a selectable one of an intuition-dominant thinking profile type, a predominately sensing and sympathizing profile type, a sensing and cogitating profile type, and an intuitive profile type;
    determining a plurality of selectable personal physical environment types;
    storing physical environment types data in a computer corresponding to the determined plurality of personal physical environment types;
    the computer correlating the at least one of a plurality of predetermined psychological profile types of the human client to a one of the selectable plurality of personal physical environment types; and
    the computer accessing a one of the plurality of selectable personal physical environment types in response to one of the predetermined psychological profile types identified in said step of subjecting the human client to psychological examination.

2. The method of claim 1, wherein the computerized psychological testing facility is an internet-based psychological testing facility.

3. The method of claim 1, wherein the psychological profile type identified in the computer in said step of identifying the psychological profile of the human client is the intuition-dominant thinking profile type and a correspondingly selected physical personal environment is an open environment with ample storage space and distinct work surfaces for multiple tasks.

4. The method of claim 1, wherein the psychological profile type identified in said step of subjecting the human client to psychological examination is a predominately sensing and sympathizing profile type and a correspondingly selected personal physical environment is a physical environment that enables interactions with other persons and work surfaces that facilitate transfer of information.

5. The method of claim 1, wherein the psychological profile type identified in said step of subjecting the human client to psychological examination is the sensing and cogitating profile type and a correspondingly selected personal physical environment is a physical environment configured for privacy and convenient access to work tools.

6. The method of claim 1, wherein the psychological profile type identified in said step of subjecting the human client to psychological examination is the predominately intuitive profile type and a correspondingly selected personal physical environment is a physical environment configured for privacy with access to storage for reference materials and a conference area.

7. The method of claim 1, wherein the psychological profile type identified in said step of identifying the psychological profile of the human client is based on a ranking of a plurality of predetermined psychological characteristics.

8. The method of claim 7, wherein the predetermined psychological characteristics relate to a plurality of predetermined action modes that characterize potential conduct of the human client.

9. The method of claim 8, wherein the predetermined action modes that characterize potential conduct of the human client are ranked relative to each other.

10. The method of claim 9, wherein said step of correlating a psychological profile type of the human client to a one of the selectable plurality of personal physical environment types is responsive to a dominant one of the predetermined action modes that characterize potential conduct of the human client.

11. A method of determining a customized environment for a human client, the method comprising the steps of:
    subjecting the human client to psychological examination using a computerized psychological testing facility to identify the psychological profile of the human client as at least one of a plurality of predetermined psychological profile types in response to a ranking of a plurality of predetermined psychological characteristics, the identified at least one of a plurality of predetermined psychological profile types being a selectable one of an intuition-dominant thinking profile type, a predominately sensing and sympathizing profile type, a sensing and cogitating profile type, and an intuitive profile type;
    determining a plurality of selectable personal physical environment types; and
    a computer correlating an identified at least one of the predetermined psychological profile types of the human client to a one of the selectable plurality of personal physical environment types.

12. The method of claim 11, wherein the predetermined psychological characteristics relate to a plurality of predetermined action modes that characterize potential conduct of the human client.

13. The method of claim 11, wherein the predetermined psychological characteristics relate to a plurality of predetermined instinctive action modes that characterize the human client.

14. The method of claim 11, wherein the predetermined psychological characteristics relate to a plurality of psychological patterns that characterize the human client.

15. A method of determining a customized environment for a human client, the method comprising the steps of:

subjecting the human client to psychological examination using a computerized psychological testing facility to produce examination data that is responsive to the responses of the human client to the psychological examination;

producing psychological profile data from the computerized psychological testing facility that is responsive to the examination data and characterizes the psychological profile of the human client to at least one of a plurality of predetermined psychological profile types that are selectable from an intuition-dominant thinking profile type, a predominately sensing and sympathizing profile type, a sensing and cogitating profile type, and an intuitive profile type;

determining a plurality of selectable personal physical environment types; and a computer correlating a psychological profile type of the human client in said step of producing psychological profile data to a one of the selectable plurality of personal physical environment types.

16. The method of claim 15, wherein said step of subjecting the human client to examination comprises the step of causing the human client to provide answers to questions.

17. The method of claim 16, wherein in said step of causing the human client to provide answers to questions, the questions are configured to facilitate identification of psychological profile characteristics of the human client.

18. The method of claim 17, wherein there is provided the further step of entering the answers to questions as the examination data into a computer system.

19. The method of claim 18, wherein said step of producing psychological profile data comprises the further step of ranking the examination data in accordance with a data ranking system that is responsive to the plurality of predetermined psychological profile types.

20. The method of claim 19, wherein said step of ranking the examination data is performed in the computer system.

21. The method of claim 15, wherein said step of correlating a psychological profile type of the human client to a one of the selectable plurality of personal environment types comprises the further step of second correlating the plurality of personal environment types to a corresponding plurality of predetermined residential environment characteristics.

22. The method of claim 15, wherein said step of correlating a psychological profile type of the human client to a one of the selectable plurality of personal physical environment types comprises the further step of second correlating the plurality of personal environment types to a corresponding plurality of predetermined office characteristics.

23. The method of claim 22, wherein there is further provided the step of third correlating each of the plurality of predetermined office characteristics to a corresponding arrangement of office furniture.

24. The method of claim 23, wherein there is further provided the step of fourth correlating each of the plurality of corresponding arrangement of office furniture to associated cataloged items of office furniture.

25. The method of claim 15, wherein the intuition-dominant cogitating profile type corresponds to a visionary client.

26. The method of claim 25, wherein in said step of correlating a psychological profile type of the human client, the personal physical environment type corresponds to an open environment with ample storage space and distinct work surfaces for multiple tasks.

27. The method of claim 15, wherein the sensing and sympathizing profile type corresponds to a cooperator client.

28. The method of claim 27, wherein in said step of correlating a psychological profile type of the human client, the personal physical environment type corresponds to a physical environment that enables interactions with other persons and work surfaces that facilitate transfer of information.

29. The method of claim 15, wherein the sensing and cogitating profile type corresponds to a stabilizer client.

30. The method of claim 29, wherein in said step of correlating a psychological profile type of the human client, the personal physical environment type corresponds to a physical environment configured for privacy and convenient access to work tools.

31. The method of claim 15, wherein the intuitive feeling profile type corresponds to a catalyst client.

32. The method of claim 31, wherein in said step of correlating a psychological profile type of the human client, the personal physical environment type corresponds to a physical environment configured for privacy with access to storage for reference materials and a conference area.

33. An arrangement for selecting a customized environment for a human client, the apparatus comprising:
    an input arrangement for receiving information corresponding to client psychological information and inputting the client psychological information into a computer;
    a client psychological information memory area for storing the client psychological information;
    a communications arrangement coupled to the computer for transmitting the client psychological information to a remote psychological testing facility and receiving psychological testing data;
    an examination memory area for storing client psychological profile information responsive to the psychological testing data;
    an environment memory area for storing information relating to a plurality of physical environment types, each physical environment type having a respectively associated memory address; and
    a processor coupled to said client psychological information memory area, said examination memory area, and to said environment memory area, said processor correlating the client profile information with one of said physical environment type memory addresses.

34. The arrangement of claim 33, wherein said remote communication arrangement comprises a modem for transmitting to a remote computer the client psychological information and receiving a responsive client psychological profile.

* * * * *